US012798513B2

(12) United States Patent
Kuenzler et al.

(10) Patent No.: US 12,798,513 B2
(45) Date of Patent: Nov. 17, 2026

(54) SEATBELT RETRACTOR HAVING AN ELECTRICALLY ACTUATABLE BLOCKING DEVICE

(71) Applicant: AUTOLIV DEVELOPMENT AB, Vargarda (SE)

(72) Inventors: Florian Kuenzler, Wedel (DE); Philip Rings, Norderstedt (DE); Anja Maleki, Glinde (DE)

(73) Assignee: AUTOLIV DEVELOPMENT AB, Vargarda (SE)

(*) Notice: Subject to any disclaimer, the term of this patent is extended or adjusted under 35 U.S.C. 154(b) by 66 days.

(21) Appl. No.: 18/871,033

(22) PCT Filed: May 10, 2023

(86) PCT No.: PCT/EP2023/062363
§ 371 (c)(1),
(2) Date: Dec. 2, 2024

(87) PCT Pub. No.: WO2023/232410
PCT Pub. Date: Dec. 7, 2023

(65) Prior Publication Data

US 2025/0326371 A1 Oct. 23, 2025

(30) Foreign Application Priority Data

Jun. 3, 2022 (DE) ..................... 10 2022 114 162.4

(51) Int. Cl.
*B60R 22/343* (2006.01)

(52) U.S. Cl.
CPC .................................. *B60R 22/343* (2013.01)

(58) Field of Classification Search
CPC ...................... B60R 22/343; B60R 2022/3402
See application file for complete search history.

(56) References Cited

U.S. PATENT DOCUMENTS 4,895,317 A 1/1990 Rumpf et al.
5,441,304 A 8/1995 Zygutis et al.
(Continued)

FOREIGN PATENT DOCUMENTS

DE 102010015785 A1 10/2011
DE 10 2019 213 915 A1 3/2021
(Continued)

*Primary Examiner* — Sang K Kim
(74) *Attorney, Agent, or Firm* — Dickinson Wright PLLC

(57) ABSTRACT

A belt retractor having a rotatably mounted belt shaft and an electrically actuatable blocking device that, when actuated, indirectly or directly brings about a blocking of the belt shaft in the pull-out direction, and an electrical line for contacting the blocking device with an external power supply and/or control device, wherein a system cap and a bearing cap are provided, and the bearing cap has a holder for the electrical blocking device, and the system cap covers the bearing cap and the electrical blocking device held thereon toward the outside when in the installed position, wherein the system cap and the bearing cap each have a sub-receiving area that, when the system cap and the bearing cap are in the installed position, complement each other to form a receiving area for a plug contact housing.

14 Claims, 5 Drawing Sheets

(56) References Cited

U.S. PATENT DOCUMENTS

| | | | | |
|---|---|---|---|---|
| 8,366,034 | B2 * | 2/2013 | Harada | B60R 22/46 242/390.8 |
| 8,573,645 | B2 * | 11/2013 | Lefevre | F42B 3/103 280/736 |
| 12,539,822 | B2 * | 2/2026 | Rings | B60R 22/343 |
| 12,559,058 | B2 * | 2/2026 | Rings | B60R 22/343 |
| 2022/0332280 | A1 | 10/2022 | Glaesser et al. | |

FOREIGN PATENT DOCUMENTS

| | | | |
|---|---|---|---|
| GB | 2398824 | A | 9/2004 |
| WO | 2012081188 | A1 | 6/2012 |

* cited by examiner

Prior art

Prior art

SEATBELT RETRACTOR HAVING AN ELECTRICALLY ACTUATABLE BLOCKING DEVICE

The present invention relates to a belt retractor having an electrically actuatable blocking device, having the features of the preamble of claim 1.

An electrically actuatable blocking device of the type in question is known, for example, from GB 2 398 824 A.

Such blocking devices are used to stop an externally toothed control disk, which is rotatably mounted on a belt shaft of the belt retractor, with respect to the belt shaft, by engagement of a blocking lever, and as a result to force a blocking pawl to perform a control movement into a toothing fixed to the vehicle, as a result of which, in turn, the belt shaft is blocked in the pull-out direction.

In conventional mechanical blocking devices, an inert mass is mounted on a contact surface which is deflected when a predetermined vehicle deceleration is exceeded, thereby deflecting the blocking lever and forcing it to engage in the toothing of the control disk. Such mechanical blocking devices are also referred to as vehicle-sensitive sensor devices. One problem of these mechanical blocking devices is that the inert mass always has to be aligned in a defined orientation on the contact surface with respect to the vehicle longitudinal axis and the vehicle transverse axis, irrespective of the installation geometry of the belt retractor, to prevent the belt shaft from being unintentionally blocked. Thus, the belt retractor must be designed to be individual to the vehicle, in that the orientation of the contact surface and the mass applied thereto, relative to the belt retractor, is individually designed such that it corresponds to the predetermined orientation, taking into account the installation geometry of the belt retractor in the vehicle. Furthermore, in the case of belt retractors integrated in the front seats, such as in the case of convertibles, there is the problem that, when the inclination angle of the backrest is adjusted or when the backrests are folded forward for access to the back seats, the inertial mass is unintentionally deflected to the contact surface and as a result the blocking lever is unintentionally forced into the external toothing of the control disk for a control movement. The belt retractor is thus blocked in the pull-out direction, and the backrest cannot be pivoted further, or the occupant cannot fasten the belt. In order to prevent this, additional disconnection mechanisms or compensation mechanisms must be provided, which, however, may in turn act only in these cases, in order to ensure the restraint of the occupant in the case of an accident in all cases. As a result of these objects to be achieved, a mechanical blocking device of this kind is mechanically very complex.

In the case of an electrically actuatable blocking device, as is known for example from GB 2 398 824 A, the movement of the blocking lever is, in contrast, electrically controlled, as a result of which the previously required inertial mass is omitted. The belt retractor can thereby be mounted unchanged in different installation positions in the vehicle and also in backrests. Furthermore, the blocking of the belt shaft can be controlled by an electrical signal proceeding from a control device. In this case, the signal can be generated by a control device which can also generate the signal depending on other sensor devices or control systems. For example, it is conceivable to automatically block the belt shaft when a dynamic assistance system is activated, which is controlled for example depending on a signal of an optical sensor device. The electrical blocking device is thus also controlled directly or indirectly, depending on the signal of the optical sensor device. Furthermore, the electrically actuatable blocking device is functional in any orientations and arrangements, since it is not actuated by inertial forces and therefore does not have to be oriented in a specific orientation relative to the vehicle driving direction. Thus, it can preferably also be arranged in seats of at least semi-autonomous vehicles, which the occupant can adjust, for improved communication with the other occupants, for alignment in a rest position, or also generally to make use of the freedom obtained by autonomous driving, in considerably larger adjustment ranges than was possible in the case of seats of conventional non-autonomous vehicles.

One problem with a belt retractor with such an electrically actuatable blocking device is that the belt retractor must have one or more electrical lines to control the blocking device, which must be contacted with an external control device or power supply. This is in particular problematic because the electrical contact can only be established when the belt retractor is installed in the vehicle, where the vehicle manufacturers place particular emphasis on a contact that is as easy to handle as possible and can be realized without errors.

The object of the invention is to provide a belt retractor with an electrically actuatable blocking device, which should have an easy-to-handle electrical contact.

In order to achieve the object, a belt retractor having the features of claim 1 is proposed. Further preferred embodiments of the invention can be gathered from the dependent claims, the figures and the associated description.

According to the basic idea of the invention, it is proposed that the system cap and the bearing cap each have a sub-receiving area which, in the installed positions of the system cap and the bearing cap, complement each other in order to form a receiving area for a plug contact housing.

The advantage of the proposed solution is that the created receiving area forms a simple guide for inserting a plug contact housing during installation. Alternatively, a plug contact housing can also already be held in the belt retractor receiving area, which is electrically connected to the electrical lines and can easily be contacted with a counter contact during installation. The receiving area is formed by a sub-receiving area on the bearing cap and one on the system cap so that the receiving area is automatically formed when installing the belt retractor and arranging the system cap on the bearing cap. It is particularly advantageous that two parts that are already provided are used here: the bearing cap and the system cap, so that the receiving area is structurally very simple and can be realized with minimal additional effort and minimal additional costs. Furthermore, the receiving area is deliberately formed by a sub-receiving area on the bearing cap, on which the holder for the blocking device is also arranged so that the receiving area is arranged in a direct spatial relationship to the blocking device held in the holder with its electrical lines to be contacted.

It is further proposed that the plug contact housing can be fixed in a form-fitting manner in the receiving area in and/or counter to a plug-in direction predetermined by the plug-in contact housing. Such a form-fit fixation of the plug contact housing can be formed, for example, by projections, grooves or lugs which secure the plug contact housing against displacement in a predetermined direction. The proposed solution allows the plug contact housing to be supported in or on the receiving area during a plug-in process and/or during a removal process of a counter contact so that the plug-in and/or removal process is facilitated by preventing the plug contact housing from slipping during the plug-in process or being pulled along during removal. Furthermore, this can prevent the connection between the electrical lines and the plug contact housing from being stressed during the plug-in and/or removal process, provided that the contact is made via a plug contact housing already fixed in the receiving area and connected to the electrical lines. In addition, the plug contact housing is thereby fixed in a predetermined orientation. This simplifies the plug-in process per se, and the handling person can more easily find the plug contact housing with the lines provided therein and make contact with the counter contact.

Furthermore it is proposed that the plug contact housing can be fixed in a form-fitting manner in the receiving area in relation to a rotational movement about an axis of rotation oriented parallel to the longitudinal axes of the electrical lines. The proposed further development secures the plug contact housing against twisting in relation to the longitudinal axes of the electrical lines.

The contact design can be realized very easily in that the receiving area has a non-circular, preferably quadrilateral, particularly preferably square shape in a plane oriented perpendicular to a predetermined plug-in direction of the plug contact housing. The non-circular, quadrilateral or even square shape of the receiving area determines the angular orientation of the plug contact housing to be inserted into the receiving area, which is adapted to the orientation of the electrical contacts to be contacted. If a plug contact housing is already held in the receiving area, the orientation of the plug contact housing is determined by the shape of the receiving area. Furthermore, the shape of the receiving area provides support for the plug contact housing so that it is also fixed in the predetermined orientation even when external forces are applied.

It is further proposed that the receiving area has a shape coding defining the arrangement and/or orientation of the plug contact housing. The shape coding of the receiving area defines the predetermined arrangement and orientation of the plug contact housing in the receiving area. The plug contact housing can therefore be arranged and held in the receiving area in only a predetermined arrangement or orientation. This predetermined orientation of the plug contact housing can, for example, be designed for a particularly favorable and very stress-free arrangement and supply of the electrical lines in the electrical blocking device to the plug contact housing. In addition, the shape coding not only directly informs the person doing the installation position in which the plug contact housing must be installed, it also prevents the plug contact housing from being installed in a different, incorrect orientation since this is not possible due to the shape coding. The shape coding can be realized, for example, by a lug, groove or step projecting on one side.

It is further proposed that the plug contact housing projects from the receiving area and is supported by a first shoulder on an outer edge of the receiving area. By supporting the plug contact housing, the plug-in forces during contacting are transmitted via the plug contact housing into the receiving area so that the electrical lines in the plug contact housing are not stressed, apart from unavoidable friction forces.

It is further proposed that the plug contact housing is supported on at least one of the two mutually facing edge sides of the sub-receiving areas via a second shoulder. The second shoulder limits the insertion depth of the plug contact housing into the respective sub-receiving area. Furthermore, the plug contact housing can be clamped more effectively in the receiving area between the sub-receiving areas.

It is further proposed that the two sub-receiving areas are connected to each other by a latching connection. The latching connection is advantageous in that it can be manufactured without any tools and very cost-effectively by molding the latching edges and latching arms integrally onto the sub-receiving areas, e.g. by means of a plastics injection molding process.

It is furthermore proposed that a control disk that is rotatably mounted on the belt shaft or on the bearing cap is provided, and the electrically actuatable blocking device has a housing with a base plate and an upright first limb, and has a blocking lever that is pivotably mounted in a pivot bearing of the upright first limb and has a steel plate, and the electrically actuatable blocking device stops the control disk in relation to the belt shaft (20) by means of an engagement of the blocking lever in the toothing the control disk and thereby forces a blocking pawl into a movement in which it comes to engage in a toothing, fixed to the vehicle, of the belt retractor and blocks the belt shaft in the pull-out direction. The triggering of the blocking of the belt shaft stopping the control disk and the resulting forced movement of the blocking pawl has long proven itself in practice, wherein the control disk only serves to control the movement of the blocking pawl, and all the forces for restraining the occupant are absorbed by the blocking pawl engaging in the toothing fixed to the vehicle.

It is furthermore proposed that the blocking lever has a lever arm that projects outward from the first limb and on which a first spring acts, which preloads the blocking lever into a position in which it engages, with a blocking tip arranged at the end of a blocking arm, in the toothing of the control disk. The proposed solution is that the blocking device is designed in such a way that in an initial state the control disk is blocked, and the belt shaft of the belt retractor is blocked.

It is furthermore proposed that the blocking device has an electromagnet arranged in the housing, which exerts a force on the blocking lever by energization, by means of which force said blocking lever is pulled out of the toothing of the control disk with the blocking tip. The electrical blocking device is designed in such a way that, in case of energization, it releases the blocking of the belt shaft by the blocking lever being pulled out of the toothing of the control disk and, when the energization is interrupted, it automatically blocks. This is an advantage for example in the event of a power failure, such as in a serious accident since the occupant is then held back in this case by the seatbelt.

It is further proposed that the plug contact housing is dimensionally stable and has a non-circular outer shape corresponding to the shape of the receiving area. If the plug contact housing is first inserted during installation in the vehicle, the proposed solution offers the advantage of an improved, anti-twist insertion movement of the plug contact housing into the receiving area. If the plug contact housing is already arranged in the receiving area of the belt retractor and the contact of the belt retractor is made via the plug contact housing, the proposed solution offers the advantage that the plug contact housing is thereby fixed in the receiving area in a predetermined orientation and can support itself in this position in the receiving area.

The invention is explained below on the basis of preferred embodiments, with reference to the accompanying figures. In the figures.

Figure 1:
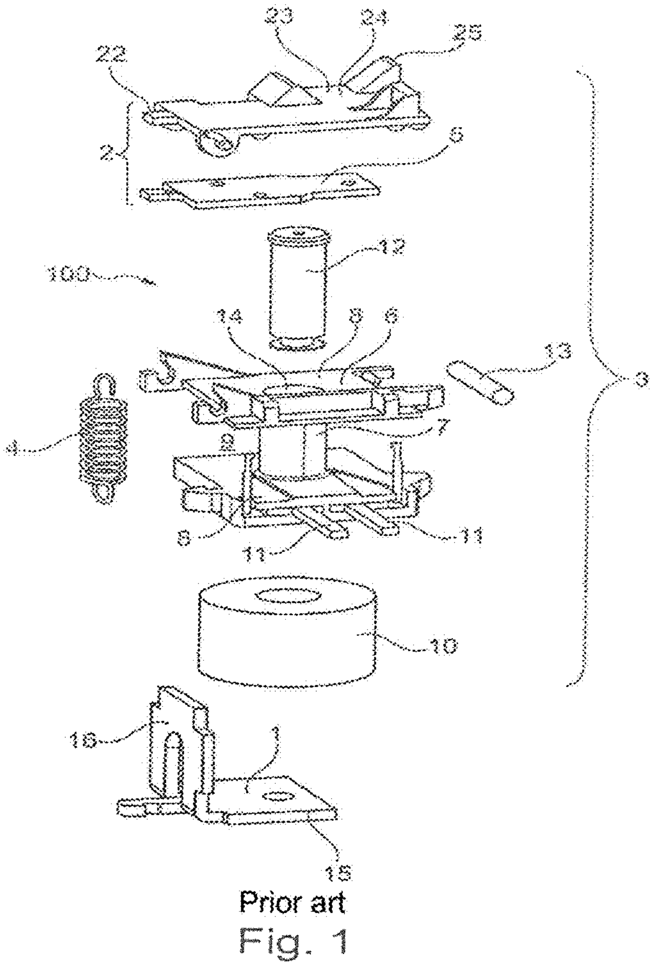
Prior art Fig. 1
FIG. 1 to 4 show an electrical blocking device according to the prior art and a belt retractor with such a blocking device.
Figure 2:
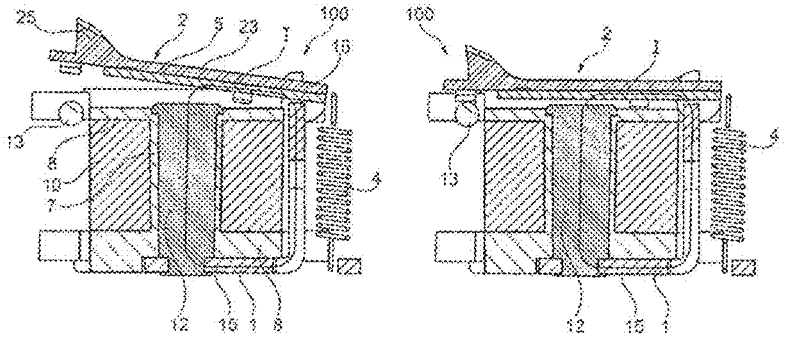
Prior art Fig. 2

An electrically actuatable blocking device 100 used by the applicant in its products and corresponding to the embodiment of GB 2 398 824 A is shown in FIGS. 1 and 2. The electrically actuatable blocking device 100 comprises, as basic elements, a housing 1 having an L-shaped basic structure comprising a base plate 15 and a first upright limb 16, a blocking lever 2 that is pivotably mounted on the first upright limb 16 of the housing 1, an electromagnet 3, and a first spring 4 which is held by one end on the housing 1 and is connected by the other end to a lever arm 22 of the blocking lever 2 projecting outwards from the first upright limb 16. The first spring 4 is designed as a tension spring, such that it preloads the blocking lever 2 into a position in which it engages with a blocking tip 25 in a toothing 26 of a control disk 21, and thereby holds the control disk 21 back with respect to the belt shaft 20. The control disk 21 with the toothing 26 can only be seen in FIG. 3 in a belt retractor according to the prior art. In this way, when the belt shaft 20 is rotated in the pull-out direction, the blocking pawl is automatically forced into a toothing fixed to the vehicle, and the belt shaft 20 is subsequently blocked against further pulling out of the belt. The blocking lever 2 comprises a contour part 24 and a steel plate 5, the steel plate 5 facing the electromagnet 3 such that the blocking lever 2 is attracted by the electromagnet 3 when this is energized, and is thus pulled out of the toothing 26 of the control disk 21. As a result, the belt shaft 20 is subsequently freely rotatable in the pull-out and retraction direction. The advantage of this solution is that the belt shaft 20 is blocked in the pull-out direction, even in the event of a power failure or a fault of the electromagnet 3, and the occupant is also reliably restrained in this case.

The electromagnet 3 comprises a base component 6 comprising a column-shaped central portion 7 and two radial flanges 8, one of which in each case projects radially outward at one of the ends of the central portion 7. The electromagnet 3 is held with the base component 6 on the base plate 15 of the housing 1. The base component 6 has a tubular through-portion 14 in the central portion 7 and an annular intermediate space 9 radially on the outside on the central portion 7, the annular intermediate space 9 being limited toward the ends the central portion 7 by the radial flanges 8. Furthermore, the electromagnet 3 comprises a coil 10 having a plurality of windings, which coil is arranged in the annular intermediate space 9 and is electrically contacted with an external control device via lines 11 provided in the base component 6. In addition, the electromagnet 3 comprises a first iron core 12 which is arranged in the tubular through-portion 14 of the base component 6 and a free end of which faces the steel plate 5 of the blocking lever 2.

When the coil 10 is energized, the blocking lever 2 is attracted in that it closes a first magnetic circuit I, which is defined by the first upright limb 16 of the housing 1, the first iron core 12, and the portions of the blocking lever 2 and the base plate 15 between the first iron core 12 and the first upright limb 16, as can be seen in the right-hand view in FIG. 2. Furthermore, a damping element 13 in the form of an inherently supple tube, for example in the form of a short tube piece, is provided, which element is clamped at its ends between two extensions of the radial flange 8 facing the blocking lever 2. The damping element 13 is positioned in such a way that the free end of the blocking lever 2 does not rest against the damping element 13 in the deflected position (left-hand view in FIG. 2), and comes to rest on the central soft portion of the damping element 13 between the clamping points only in the attracted position (right-hand view in FIG. 2). As a result, the attraction movement of the blocking lever 2 is damped in the final phase of the movement. As a result of this damping, a soft stop is implemented, and disruptive "rattling noises" are avoided during the attraction movement and possible subsequent slight movements of the blocking lever 2.

Figure 4:
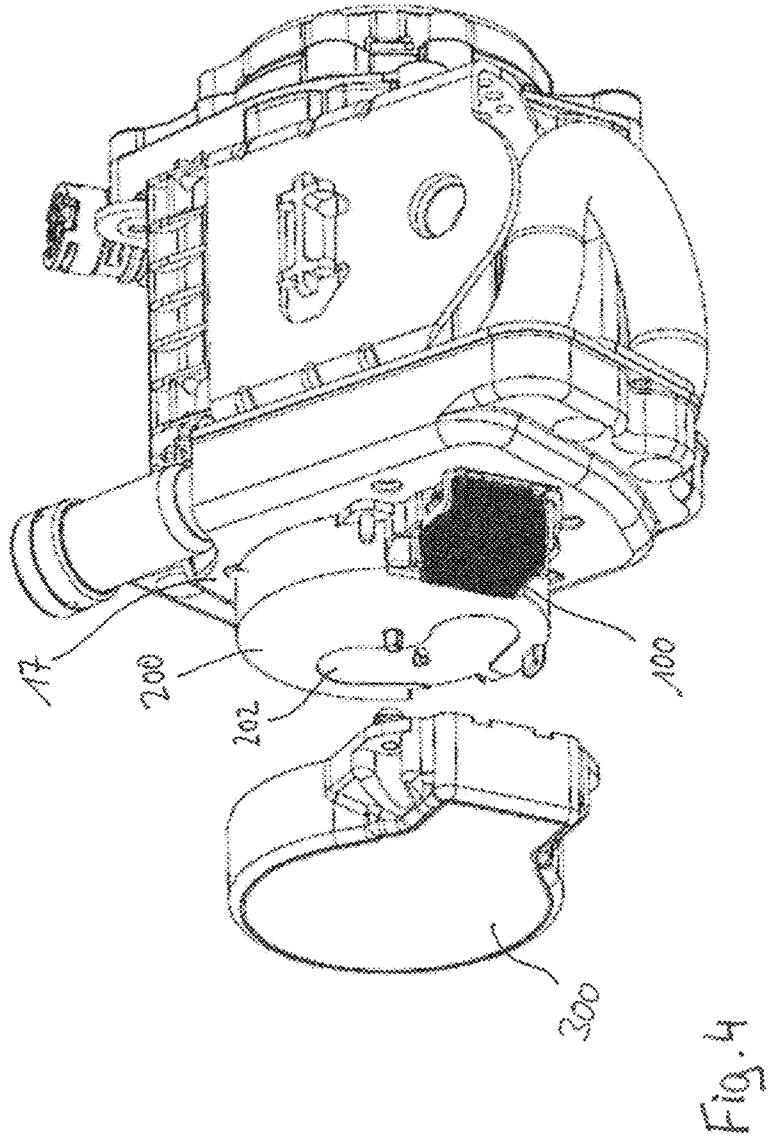

The blocking device 100 is fastened in a holder 201 of a bearing cap 200 on which the control disk 21 and/or the belt shaft 20 can be mounted. The bearing cap 200 itself is held on a frame 17 of the belt retractor as can be seen in FIG. 4. Furthermore, the bearing cap 200 can have on its outside a contour 202 in the form of a toothing or bearing structure for a gear drive for an ELR/ALR switching device. Furthermore, the bearing cap 200 has a recess 203 through which the control disk 21 arranged in the bearing cap 200 is exposed to the outside so that the blocking lever 2 with its blocking tip 25 can be guided from the outside into the toothing 26 of the control disk 21.

The bearing cap 200 is covered on the outside by a system cap 300 which can be seen in FIG. 4 and which in turn is fastened directly to the frame 17 or indirectly via the bearing cap 200 to the frame 17. The system cap 300 therefore covers the bearing cap 200 and the blocking device 100 held thereon towards the outside and forms a protection of the blocking device 100 and the other parts on the bearing cap 200 against outer mechanical influences.

The electrically actuatable blocking device 100 is shown here with reference to an embodiment in which the blocking lever 2 is spring-loaded in the engaged position. However, the electrically actuatable blocking device 100 can also be designed such that the blocking lever is spring-loaded counter to the direction of engagement and is only driven to an engagement movement in the toothing 26 by energizing the electromagnet 10 and the magnetic force acting thereby. Furthermore, an electrically actuatable blocking device 100 can also be used which triggers the blocking of the belt shaft 20 during energization or when the current is interrupted by a differently designed mechanical blocking device. What is important for the invention is only that the electrically actuatable blocking device has electrical lines 11, which must be contacted when installing the belt retractor or when installing the belt retractor in the vehicle.

Figure 3:
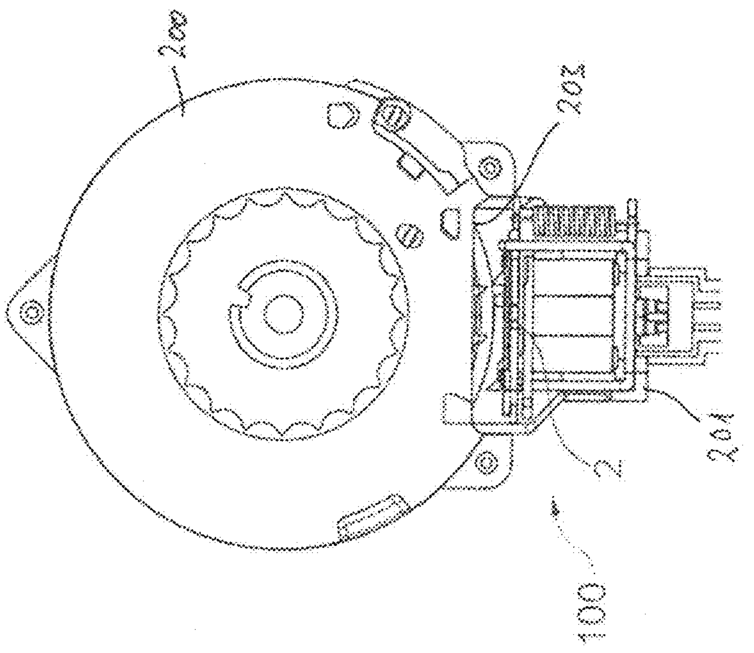
Figure 3:
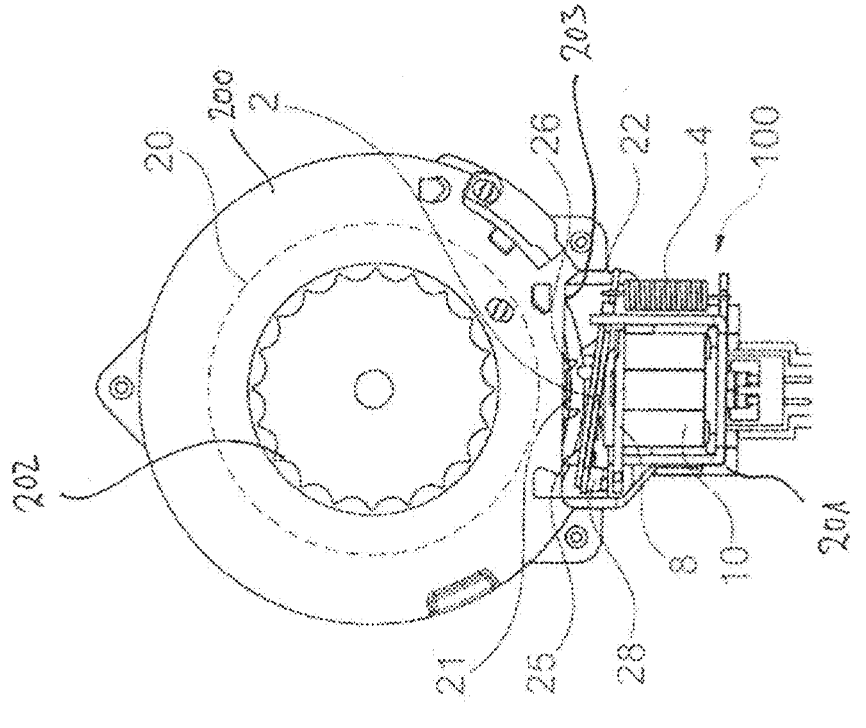
Figure 6:
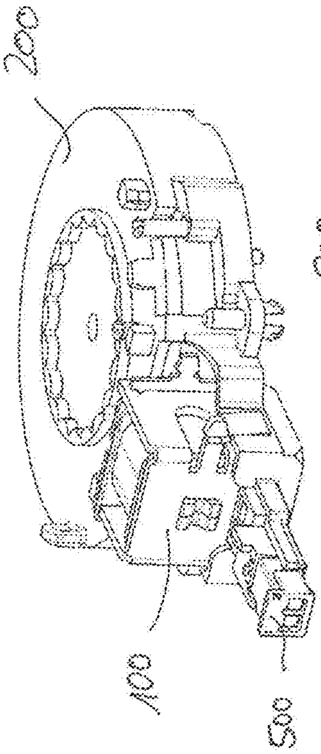
FIG. 5 to 11 show a further developed blocking device with a bearing cap and a system cap of a belt retractor according to the invention in various representations.
Figure 7:
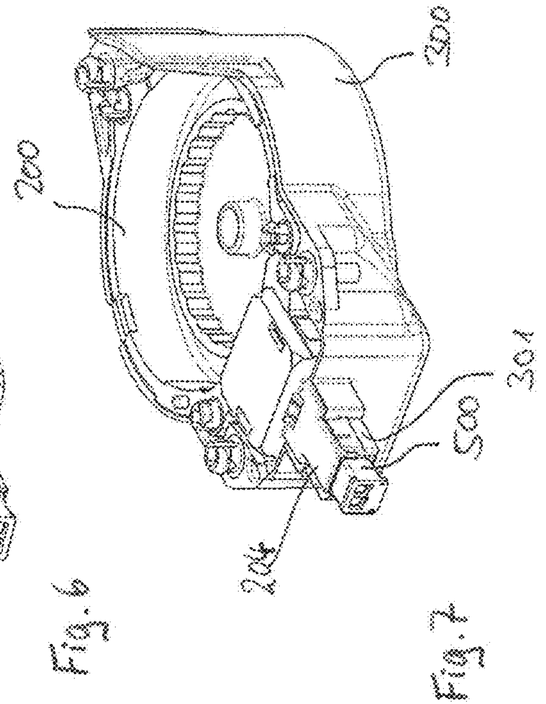
Figure 5:
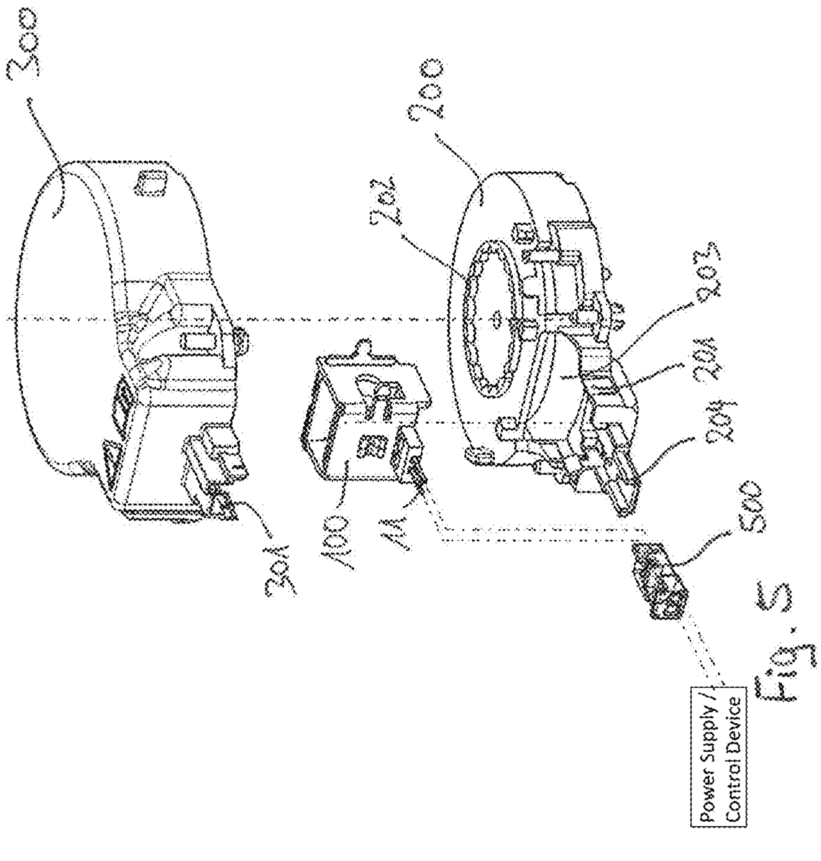

FIG. 5 to 7 show a new bearing cap 200, a new system cap 300 and a further developed electrical blocking device 100 of a further developed belt retractor. The belt retractor according to the invention is formed by replacing the bearing cap 200, the system cap 300 and the electrical blocking device 100 in the belt retractor, which is shown in FIGS. 3 and 4, with a bearing cap 200, a system cap 300 and an electrical blocking device 100 as shown in FIG. 5 to 7. Otherwise, the components, in particular the frame 17 with its fastening points, of the belt retractor can remain unchanged.

The electrical blocking device 100, the bearing cap 200 and the system cap 300 of FIG. 5 to 7 correspond in their basic structure to the electrical blocking device 100, the bearing cap 200 and the system cap 300 shown in FIG. 1 to 4, wherein the bearing cap 200, the system cap 300 and the blocking device 100 of FIG. 5 to 7 are described below. The bearing cap 200 has a holder 201 in which the electrical blocking device 100 is held. The holder 201 is extended towards its radial outer side to form a sub-receiving area 204. The system cap 300 also has a sub-receiving area 301 extending radially outward. Furthermore, a plug contact housing 500 is provided, which is placed on the free electrical lines 11 of the blocking device 100 and is connected to them, for example, in a crimping process.

In the installed position, the system cap 300 and the bearing cap 200 together form a receiving area 400 in the intermediate space between the sub-receiving area 301 of the system cap 300 and the sub-receiving area 204 of the bearing cap 200 in which the plug contact housing 500 is held. For installation, the plug contact housing 500 is placed on the electrical lines 11 of the electrical blocking device 100. Subsequently, the blocking device 100 is inserted into the holder 201 of the bearing cap 200, and the plug contact housing 500 held thereto via the electrical lines 11 is inserted into the sub-receiving area 204. Alternatively, the plug contact housing 500 can also be placed on the electrical lines 11 after the electrical blocking device 100 has already been inserted into the holder 201. The system cap 300 is then put on, covering the free side of the plug contact housing 500, and the sub-receiving area 204 of the bearing cap 200 is completed by the sub-receiving area 301 of the system cap 300 to form the receiving area 400. Furthermore, the plug contact housing 500 can also be inserted into the receiving area 400 from the outside after the system cap 300 and the bearing cap 200 have been assembled, for example when installing the belt retractor in the vehicle.

Figure 9:
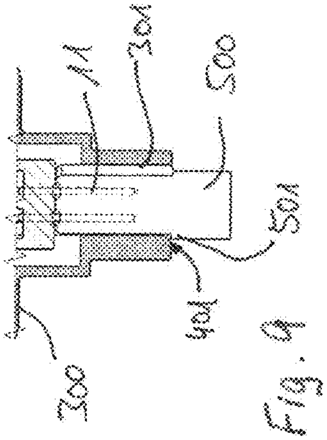
Figure 8:
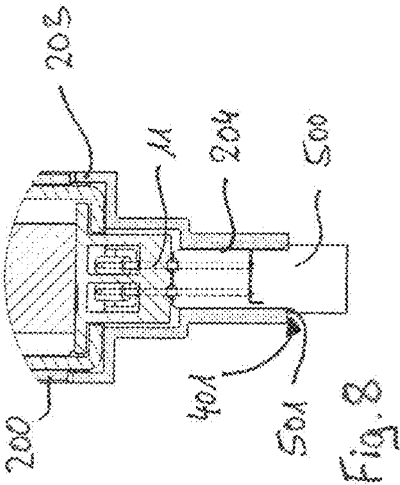

In FIG. 8, a section of the bearing cap 200 can be seen in a view of the plug contact housing 500 arranged in the sub-receiving area 204. The plug contact housing 500 is shaped such that it projects from the front side of the sub-receiving area 204. FIG. 9 shows a section of the system cap 300 in a view of the plug contact housing 500 arranged in the sub-receiving area 301. The plug contact housing 500 is shaped such that it projects from the front of the sub-receiving area 301. Furthermore, the plug contact housing 500 is shaped such that it covers the front edges of the sub-receiving areas 204 and 301 and therefore the front edge 401 of the assembled receiving area 400 with a first shoulder 501.

Figure 11:
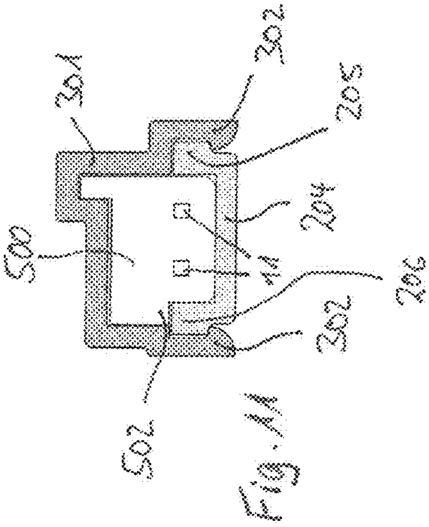
Figure 10:
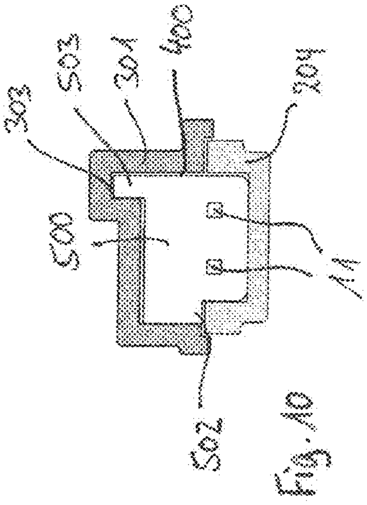

In FIGS. 10 and 11, the plug contact housing 500 can be seen in the receiving area 400 in two different sectional planes perpendicular to the electrical lines 11. The sub-receiving areas 204 and 301 are each U-shaped in cross section with a base plate and two laterally upright side walls oriented parallel to each other. In the assembled position of the system cap 300 and the bearing cap 200, the sub-receiving areas 204 and 301 complement each other to forma receiving area 400 with a non-circular cross section, preferably approximately rectangular or even square-shaped, in which the plug contact housing 500 is non-rotatably fixed in relation to its longitudinal axis or the longitudinal axes of the electrical lines 11. Furthermore, the sub-receiving area 301 of the system cap 300 has a groove 302 arranged on one side, which has a shape corresponding to an upright lug 503 of the plug contact housing 500. The groove 303 of the sub-receiving area 301 and the lug 503 of the plug contact housing 500 together form a shape coding which enables or defines the arrangement of the plug contact housing 500 in only one position and orientation in the receiving area 400. Furthermore, the plug contact housing 500 has a second shoulder 502 with which it rests on the edge side of the sub-receiving area 204, which faces the sub-receiving area 301 of the system cap 300. Furthermore, the two upright side walls of the sub-receiving area 204 are shaped into thickened projections 205 and 206 to form latching edges. The upright side walls of the sub-receiving area 301 of the system cap 300 are designed as latching arms with corresponding latching edges. To establish the connection between the system cap 300 and the bearing cap 200, the latching arms 302 are fixed in a form-fitting manner by latching behind the latching edges of the projections 205 and 206, as can be seen in FIG. 11. The plug contact housing 500 is fixed in the receiving area 400. Furthermore, the plug contact housing 500 is supported via the second shoulder 502 on the upper edge side of the sub-receiving area 204.

The plug contact housing 500 is fixed with a form fit in the electrical lines 11 held therein in the receiving area 400 in that it itself has a cross-sectional shape corresponding to the cross-sectional shape of the non-circular receiving area 400 and is thereby non-rotatably fixed in the receiving area 400 with respect to its longitudinal axis. Furthermore, during the plug-in process of an external plug contact, the plug contact housing 500 is supported via the first shoulder 501 on the front edge 401 of the receiving area 400 so that the connection points between the plug contact housing 500 and the electrical lines 11 are not stressed. In the same way, a form-fit connection of the plug contact housing 500 in the receiving area 400 can also be provided counter to the plug-in direction, i.e., in the removal direction of the external plug contact.

The additionally provided plug contact housing 500 and its fixation in the receiving area 400 simplify the contacting, i.e., the installation of the belt retractor itself and the installation of the belt retractor in the vehicle. Furthermore, the contacting is further improved since the electrical lines 11 are no longer stressed when the contact is made. In addition, the contact point of the electrical lines 11 is in principle relieved via the plug contact housing 500 fixed in the receiving area 400 since the plug contact housing 500 is supported in the receiving area 400, and all reaction forces act in the receiving area 400.

The invention claimed is:

1. A belt retractor, comprising:
- a rotatably mounted belt shaft;
- an electrically actuatable blocking device which directly or indirectly blocks the belt shaft in the pull-out direction upon being actuated; and
- an electrical line for bringing the blocking device into contact with at least one of an external power supply and a control device, wherein
- a system cap and a bearing cap are provided, and
- the bearing cap has a holder for the electrical blocking device, and
- the system cap covers the bearing cap and the electrical blocking device held thereon from the outside in the installed position, wherein
- the system cap and the bearing cap each have a sub-receiving area which, in the installed position of the system cap and the bearing cap, complement each other in order to form a receiving area for a plug contact housing.

2. The belt retractor according to claim 1, wherein the plug contact housing can be fixed via a form-fit connection in the receiving area in an orientation predetermined by the plug-in contact housing.

3. The belt retractor according to claim 1, wherein the plug contact housing can be fixed via a form-fit connection in the receiving area in relation to a rotational movement about an axis of rotation oriented parallel to the longitudinal axes of the electrical lines.

4. The belt retractor according to claim 3, wherein the receiving area has a non-circular shape in a plane oriented perpendicular to a predetermined plug-in direction of the plug contact housing.

5. The belt retractor according to claim 4, wherein the receiving area has a quadrilateral shape.

6. The belt retractor according to claim 4, wherein the receiving area has a square shape.

7. The belt retractor according to claim 1, wherein the receiving area has a shape defining at least one of the arrangement and the orientation of the plug contact housing.

8. The belt retractor according to claim 1, wherein the plug contact housing projects from the receiving area and is supported by a first shoulder on an outer edge of the receiving area.

9. The belt retractor according to claim 1, wherein the plug contact housing is supported on at least one of the two mutually facing edge sides of the sub-receiving areas via a second shoulder.

10. The belt retractor according to claim 1, wherein the two sub-receiving areas are connected to each other by a latching connection.

11. The belt retractor according to claim 1, wherein a control disk rotatably mounted on the belt shaft or on the bearing cap is provided, the electrically actuatable blocking device has a housing with a base plate and an upright first limb, has a blocking lever that is pivotably mounted in a pivot bearing of the upright first limb and has a steel plate, and the electrically actuatable blocking device stops the control disk in relation to the belt shaft by means of an engagement of the blocking lever in the toothing the control disk and thereby forces a blocking pawl into a movement in which it comes to engage in a toothing, fixed to the vehicle, of the belt retractor and blocks the belt shaft in the pull-out direction.

12. The belt retractor according to claim 11, wherein the blocking lever has a lever arm that projects outward from the first limb and on which a first spring acts, which preloads the blocking lever into a position in which it engages, with a blocking tip arranged at the end of a blocking arm, in the toothing of the control disk.

13. The belt retractor according to claim 12, wherein the blocking device has an electromagnet arranged in the housing, which exerts a force on the blocking lever by energization, by means of which force said blocking lever is pulled out of the toothing of the control disk with the blocking tip.

14. The belt retractor according to claim 1, wherein the plug contact housing is dimensionally stable and has a non-circular outer shape corresponding to the shape of the receiving area.

* * * * *